(12) United States Patent  
Francis et al.

(10) Patent No.: US 9,304,845 B2  
(45) Date of Patent: Apr. 5, 2016

(54) STORAGE INTEGRITY VALIDATOR

(71) Applicant: International Business Machines Corporation, Armonk, NY (US)

(72) Inventors: Huw Francis, Winchester (GB); David A. Sinclair, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 14/258,335

(22) Filed: Apr. 22, 2014

(65) Prior Publication Data

US 2014/0359399 A1 Dec. 4, 2014

(30) Foreign Application Priority Data

May 31, 2013 (GB) .................................. 1309741.5

(51) Int. Cl.
*G06F 11/10* (2006.01)
*G06F 11/07* (2006.01)

(52) U.S. Cl.
CPC ........ *G06F 11/0751* (2013.01); *G06F 11/0727* (2013.01)

(58) Field of Classification Search
CPC .................................................. G06F 11/1068
USPC .................................. 714/773, 776, 763, 727
See application file for complete search history.

(56) References Cited

U.S. PATENT DOCUMENTS

| | | | |
|---|---|---|---|
| 6,553,511 B1 | 4/2003 | DeKoning et al. | |
| 7,020,805 B2 | 3/2006 | Talagala et al. | |
| 7,200,626 B1 * | 4/2007 | Hoang | G06F 11/0751 |
| 7,552,357 B2 | 6/2009 | Grcanac et al. | |
| 7,890,815 B2 | 2/2011 | Hafner et al. | |
| 8,108,613 B2 | 1/2012 | Durica et al. | |
| 8,140,909 B2 | 3/2012 | Luan et al. | |
| 8,250,453 B2 | 8/2012 | Matsushige | |
| 2004/0250028 A1 | 12/2004 | Daniels et al. | |
| 2005/0005191 A1 | 1/2005 | Judd | |
| 2009/0055584 A1 | 2/2009 | Hafner et al. | |
| 2009/0216944 A1 | 8/2009 | Gill et al. | |
| 2009/0276586 A1 | 11/2009 | Royer et al. | |
| 2010/0191910 A1 | 7/2010 | Gates et al. | |
| 2011/0072300 A1 | 3/2011 | Rousseau | |
| 2012/0304025 A1 | 11/2012 | O'Connor | |
| 2013/0007531 A1 | 1/2013 | Jibbe et al. | |

OTHER PUBLICATIONS

GB Application 1309741.5, entitled "Storage Integrity Validator," filed on May 31, 2013.

(Continued)

*Primary Examiner* — Fritz Alphonse
(74) *Attorney, Agent, or Firm* — Penny L. Lowry; Randall J. Bluestone

(57) ABSTRACT

A sequence code verification system can be designed to include a data reader, a validity engine, and an error notifier. The data reader can read sequence codes from consecutive logical blocks. The validity engine can invalidate write operations in response to checking data validity by applying comparison operations to sequence codes and block offsets of batch write operations. The error notifier can notify a user of an error for each invalidated write operation batch. The system can validate data written to logical blocks on a storage subsystem adapted so that, during write operations, an additional sequence code is written to each logical block of data. The sequence code can remain constant for each write operation batch and the sequence code can be incremented for each new write operation batch.

20 Claims, 4 Drawing Sheets

(56) References Cited

OTHER PUBLICATIONS

Fox, M., "End-to-end data protection using T10 standard data integrity field," IBM developerWorks, May 24, 2011, © Copyright IBM Corporation 2011.

Riska et al., "Idle read after write: IRAW," Proceedings of the 2008 Annual Technical Conference, pp. 43-56, USENIX Association Berkeley, CA, USA © 2008.

International Search Report dated Nov. 21, 2013 for International Application No. 1309741.5, 4 pages.

* cited by examiner

STORAGE INTEGRITY VALIDATOR

TECHNICAL FIELD

This invention relates to a method and apparatus for detecting erroneous writes in a storage system. The apparatus can be an integrity validator or integrity protection tool or any test tool for detecting erroneous writes including torn writes and dropped writes.

BACKGROUND

In a storage subsystem under test it is challenging to detect defective behavior for erroneous writes including torn writes and dropped writes. A dropped write occurs when a write operation to a storage subsystem acknowledges completion but the storage subsystem does not receive the complete set of data.

A torn write occurs when a write operation to a storage subsystem experiences an error and the storage subsystem does not receive the complete set of data. The actual storage subsystem data is expected to be a mix of the old data that was on the storage system disk before the write operation started and the new data that is associated with the planned write to the storage subsystem. The actual data on the storage subsystem could be all old data, all new data, or any mix in-between.

When an error occurs, a storage subsystem will perform one of the following actions: write a complete logical block (for instance five hundred and twelve bytes); not write the logical block at all; or return a medium or hardware error for that logical block if the logical block is partially written to. Therefore, for an unknown torn error, it can be expected that data boundaries between old and new data will occur at logical block boundaries. A storage subsystem will guarantee that the boundary between the old and the new data will occur in certain places. It would desirable to be able to use these characteristics to determine errors.

When developing a storage subsystem, test engineers will run test programs on application hosts. The test programs perform read and write operations to the storage subsystem to validate that the storage subsystem is behaving as intended. Under normal conditions (that is when there are no error conditions present), test programs will expect the data read from the storage subsystem to match exactly the data that was written to the storage subsystem. If, however, an error occurs (such as a broken cable, or software failure), then the read and/or write operations to the storage subsystem will not complete reliably. The test program cannot expect the data read back from the storage subsystem to match exactly the data that was previously written. Even though a write has failed, however, the storage subsystem specification may state that there are some constraints on what data can be returned to a subsequent read from the same area of the storage subsystem. It would be desirable to be able to confirm that these constraints are met.

SUMMARY

In a first aspect of the invention there is provided a verification system for validating data written to logical blocks on a storage subsystem, said storage subsystem being adapted so that during write operations of data to the logical blocks, an additional sequence code is written to each logical block whereby said sequence code remains constant for each write operation batch and whereby said sequence code is incremented for each new write operation batch, said verification system comprising: a data reader for reading respective first and second sequence codes (S(n) and S(n+1)) from consecutive first and second logical blocks (L(n) and L(n+1)); a validity engine for checking validity by applying the following operations: invalidating the corresponding write operation batch if the first sequence code (S(n)) is less than the second sequence code (S(n+1)) and a block offset (F(n+1)) of the second logical block (L(n+1)) is not equal to zero; and invalidating the corresponding write operation batch if the first sequence code S(n) is more than the second sequence code S(n+1) and a block offset (F(n)) of the first logical block (L(n)) does not correspond to the number of logical blocks in the corresponding batch write operation for the first logical block (L(n)); and an error notifier for notifying an error for each invalidated write operation batch.

The embodiments include a number of predetermined pieces of information in the data written to each logical block on a storage subsystem, and to apply rules in a test program that read this data and enable the test program to determine if the data meets the constraints for an erroneous write in the storage subsystem. Other test tools can determine if there are parts of the data that are missing or incorrect, but cannot determine if the missing data matches the characteristics of a torn write.

The embodiments have a technical effect on technical input and output processes carried on outside the computer resulting from reduction of individual errors and overall reliability improvements. The embodiments have a technical effect that operates at the machine and system level of a computer and below an overlying application level so that all improvements are transparent to computer applications. The embodiments improved operational reliability results in the computer being made to operate in a new way.

In a second aspect of the invention there is provided a method for validating data written to logical blocks on a storage subsystem, said storage subsystem being adapted so that during write operations of data to logical blocks, an additional sequence code is written to each logical block whereby said sequence code remains constant for each write operation batch and whereby said sequence code is incremented for each new write operation batch, said method comprising: (A) reading respective first and second sequence codes (S(n) and S(n+1)) from consecutive first and second logical blocks (L(n) and L(n+1)); (B) checking validity by applying the following operations: (1) invalidating the corresponding write operation batch if the first sequence code (S(n)) is less than the second sequence code (S(n+1)) and a block offset (F(n+1)) of the second logical block (L(n+1)) is not equal to zero; (2) invalidating the corresponding write operation batch if the first sequence number (S(n)) is more than the second sequence number (S(n+1)) and a block offset F(n) of the first block (L(n)) does not correspond to the number of logical blocks in the corresponding batch write operation for the first logical block (L(n)); (C) notifying an error for each invalidated write operation batch; and performing steps (A), (B) and (C) for each logical block (n) from a plurality of logical blocks (zero to N).

Suitably, the sequence code is written to that part of the logical block that is reserved for application data. This is appropriate for testing environments and is appropriate when there is not enough room in a metadata portion of a logical block.

Alternatively, the sequence code is written to that part of the logical block that is reserved for metadata. This is appropriate for production environments and is appropriate when there is enough room in a metadata portion of a logical block.

Advantageously, the method further comprises ensuring that a first thread (A) places a reservation in the storage subsystem, for those logical blocks that it is going to write to, before it obtains the sequence number it will use in the write. Therefore, if other threads (such as B, C or n) try to write to an area of the disk including one or more of these logical blocks, then the other threads will not be able get a reservation on those logical blocks. The reservation prevents writes from other threads being able to get a later sequence number than the first thread until the first thread is completed. Once the first thread has completed then the reservation is released and other threads can proceed to use the previously reserved logical blocks. Therefore, such a reservation scheme ensures that overlapping writes are not performed.

More advantageously, the sequence number is an eight byte value. This means that, in any given test, there is no practical chance of this sequence number wrapping back to zero, as at a thousand write operations per second, it would take about five hundred million years to wrap.

Even more advantageously, validity is checked by applying a further test of validating the logical block pair (L(n) and L(n+1)) if a torn write occurs at logical block address L(n) and if the block offset F(n) modulus of a predetermined block boundary length is zero. For instance, it would be known that the tear in the write is at a thirty two block boundary relative to the start of the write and in the case of certain storage systems (like a storage volume controller (SVC)) this would be a torn write that is allowed to occur. Other predetermined block boundary lengths are sixty four and a hundred and twenty eight (as associated with storage volume controllers) or any number and not necessarily a multiple of two.

Still more advantageously the block offset (F(n)) of the first logical block (L(n)) equals the number of logical blocks in the batch write operation minus one.

In a third aspect of the invention there is provided a computer program product for validating write operation batches to a storage subsystem, the computer program product comprising a computer-readable storage medium having computer-readable program code embodied therewith and the computer-readable program code configured to perform all the steps of the methods.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In a fourth aspect of the invention there is provided a computer program stored on a computer readable medium and loadable into the internal memory of a digital computer, comprising software code portions, when said program is run on a computer, for performing all the steps of the method claims.

In a fifth aspect of the invention there is provided a data carrier aspect of an embodiment that comprises functional computer data structures to, when loaded into a computer system and operated upon thereby, enable said computer system to perform all the steps of the method claims. A suitable data-carrier could be a solid-state memory, magnetic drive or optical disk. Channels for the transmission of data may likewise comprise storage media of all descriptions as well as signal-carrying media, such as wired or wireless signal-carrying media.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Embodiments of the present invention will now be described, by way of example only, with reference to the following drawings in which.

Figure 1:
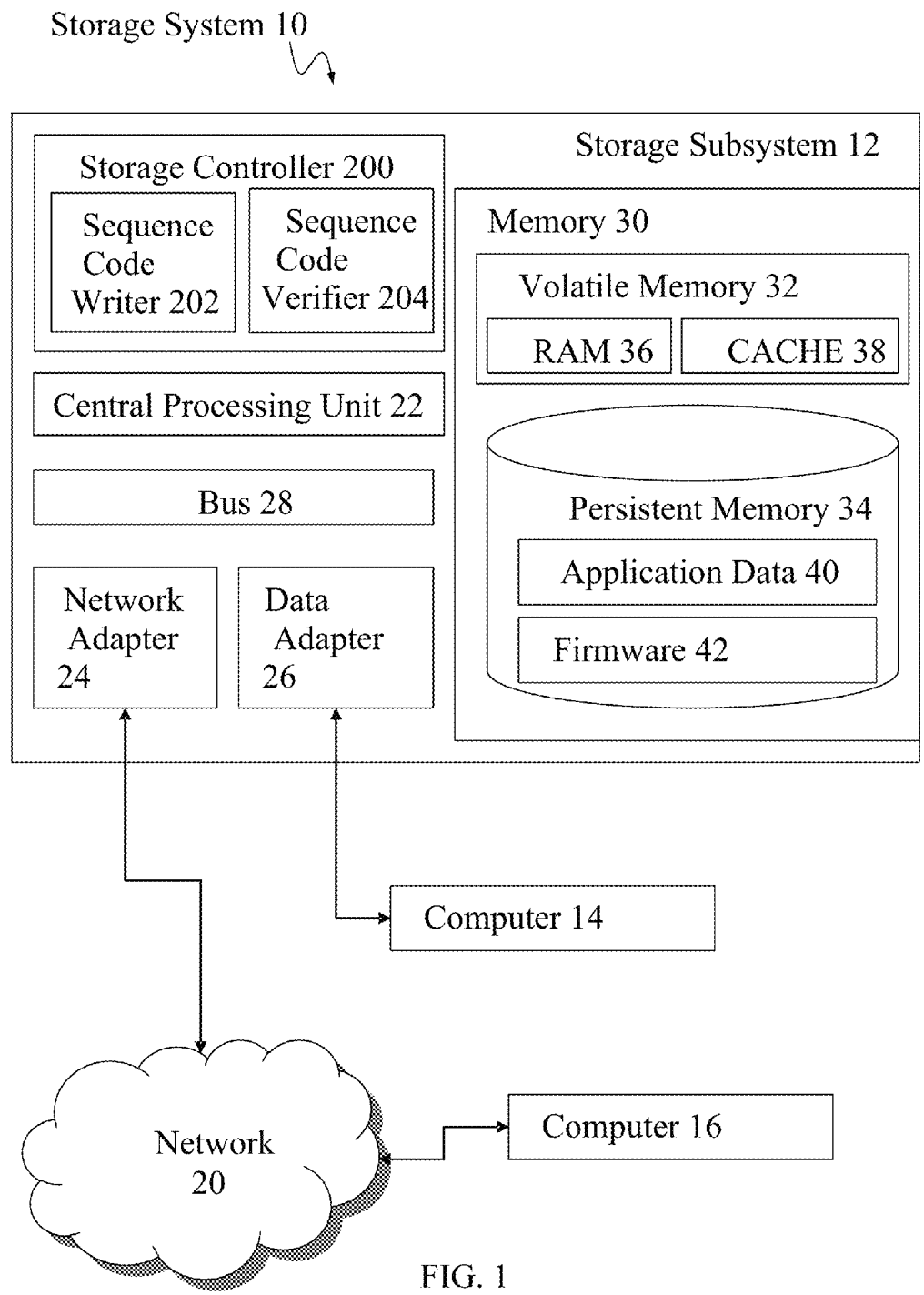
FIG. 1 is a deployment diagram of an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

Referring to FIG. 1, the deployment of an embodiment in storage system 10 is described. Storage system 10 is operational with numerous other general purpose or special purpose computing system environments or configurations. Examples of well-known computing processing systems, environments, and/or configurations that may be suitable for use with storage system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Storage system 10 may be described in the general context of computer system-executable instructions, such as program modules, being executed by a computer processor. Generally, program modules may include routines, programs, objects, components, logic, and data structures that perform particular tasks or implement particular abstract data types. Storage system 10 may be embodied in distributed cloud computing environments where tasks are performed by remote processing devices that are linked through a communications network. In a distributed cloud computing environment, program modules may be located in both local and remote computer system storage media including memory storage devices.

Storage subsystem 10 comprises: storage subsystem 12 and one or more computers 14 directly attached to the storage subsystem 12 and one or more computers 16 attached via a network 20 to the storage subsystem 12. Network 20 can be a local area network (LAN), a wide area network (WAN), or the Internet.

Storage subsystem 12 comprises: central processing unit (CPU) 22; network adapter 24; device adapter 26; bus 28; memory 30 and storage controller 200.

CPU 22 loads machine instructions from memory 30 and performs machine operations in response to the instructions. Such machine operations include: incrementing or decrementing a value in register (not shown); transferring a value from memory 30 to a register or vice versa; receiving instructions from a different location in memory if a condition is true or false (also known as a conditional branch instruction); and operating on the values in two different registers and putting the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the storage subsystem 12 and network attached computers 16.

Device adapter 26 is connected to bus 28 for enabling communication between storage subsystem 12 and computers 14.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally volatile memory is used because it is faster and generally non-volatile memory is used because it will hold the data for longer. Storage subsystem 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

Persistent memory 34 comprises application data 40 and firmware 42. During operation some or all of the application data is loaded to volatile memory 32. Further program modules that support an embodiment but are not shown include operating system, and support applications. Each of the operating system, support applications, other program modules, and program data or some combination thereof, may include an implementation of a networking environment.

Storage controller 200 is for controlling input and output to the volatile memory 32 and persistent memory 34. Storage controller 200 comprises: sequence code writer 202 and sequence code verifier 204 described in more detail below. Storage controller 200 is shown as part of storage system 10 in an embodiment but other embodiments are envisaged where a storage controller is a stand alone component or part of a more general computer system.

Storage system 10 communicates with at least one network 20 (such as a local area network (LAN), a general wide area network (WAN), and/or a public network like the Internet) via network adapter 24. Network adapter 24 communicates with the other components of storage subsystem 12 via bus 28. It should be understood that although not shown, other hardware and/or software components could be used in conjunction with storage system 10. Examples, include, but are not limited to: microcode, device drivers, redundant processing units, external disk drive arrays, redundant array of independent disks (RAID), tape drives, and data archival storage systems.

Figure 2A:
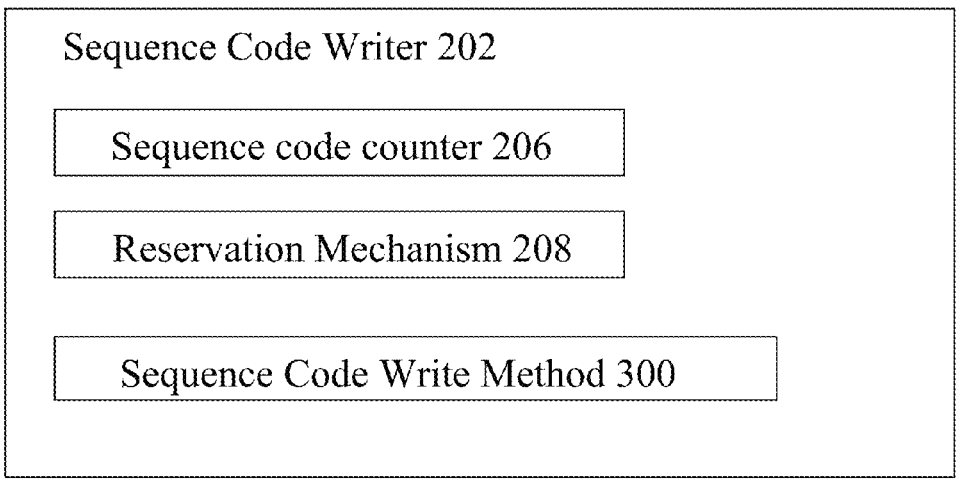
FIG. 2A is a component diagram of a sequence code writer of an embodiment.

Referring to FIG. 2A, sequence code writer 202 comprises: sequence code counter 206; reservation mechanism 208; and sequence code write method 300.

Sequence code counter 206 is for counting a sequence code.

Reservation mechanism 208 is for ensuring that a first thread (A) places a reservation in the storage subsystem for logical blocks of data that it is going to write to, before it obtains the sequence code it will use in the write. If other threads (such as B, C or n) try to write to an area of the storage including one or more of logical block, then the other threads will not be able get a reservation on those logical blocks. This will prevent writes from other threads being able to get a later sequence number than the first thread until the first thread is completed. Once the first thread has completed its write, it releases the reservation on the logical block and other threads can proceed.

Sequence code write method 300 is for writing sequence code during data write operations and is described in more detail below with respect to FIG. 3.

Figure 2B:
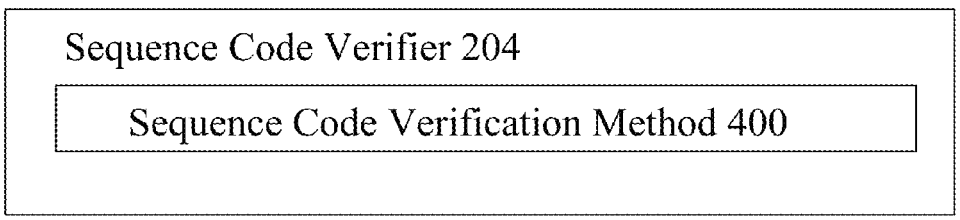
FIG. 2B is a component diagram of a sequence code verifier of an embodiment.

Referring to FIG. 2B, sequence code verifier 204 comprises sequence code verification method 400.

Figure 4:
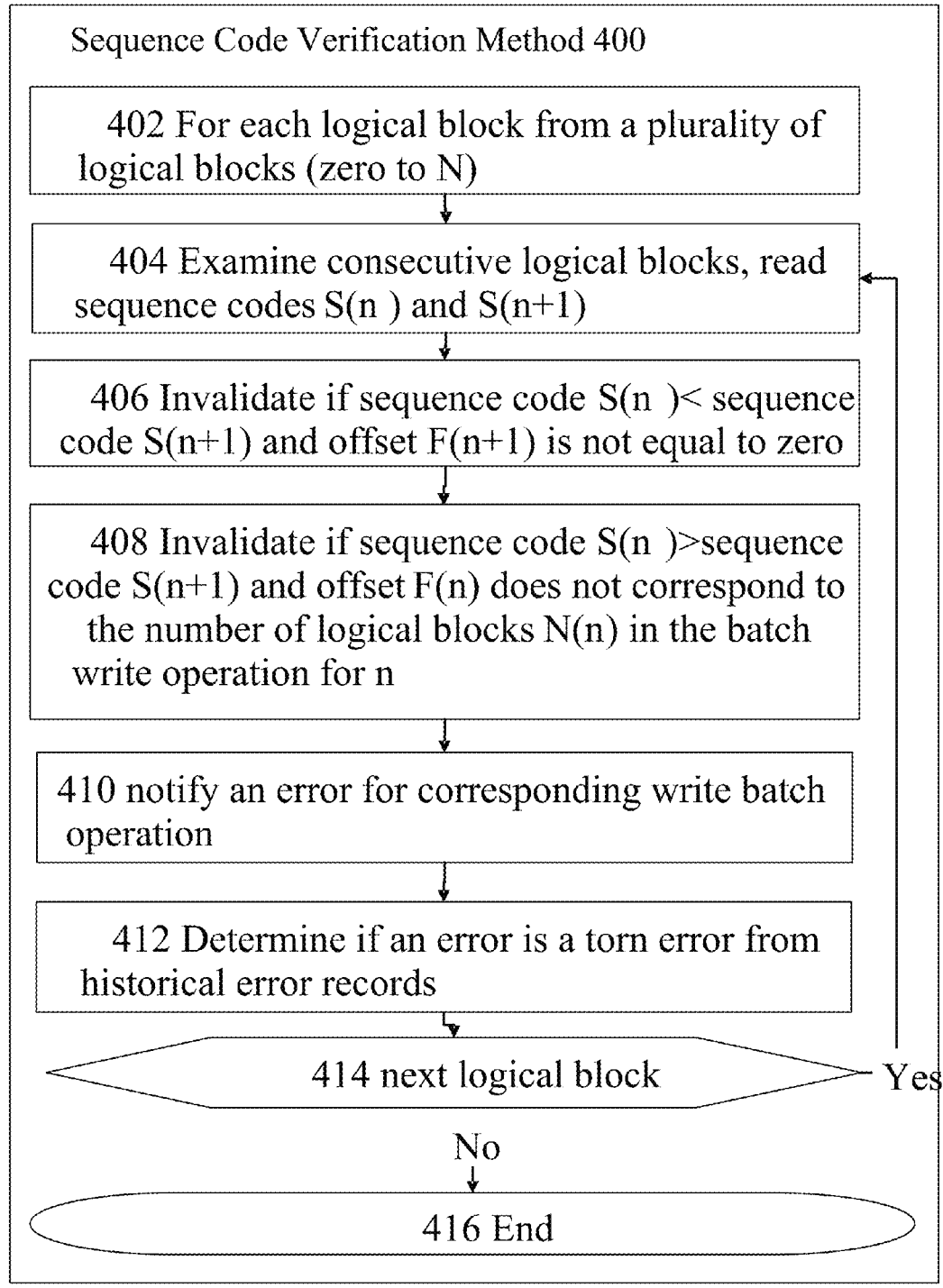
FIG. 4 is a flow diagram of a sequence code verification method of an embodiment.

Sequence code verification method 400 is for verifying the sequence code and is described in more detail with respect to FIG. 4.

Figure 3:
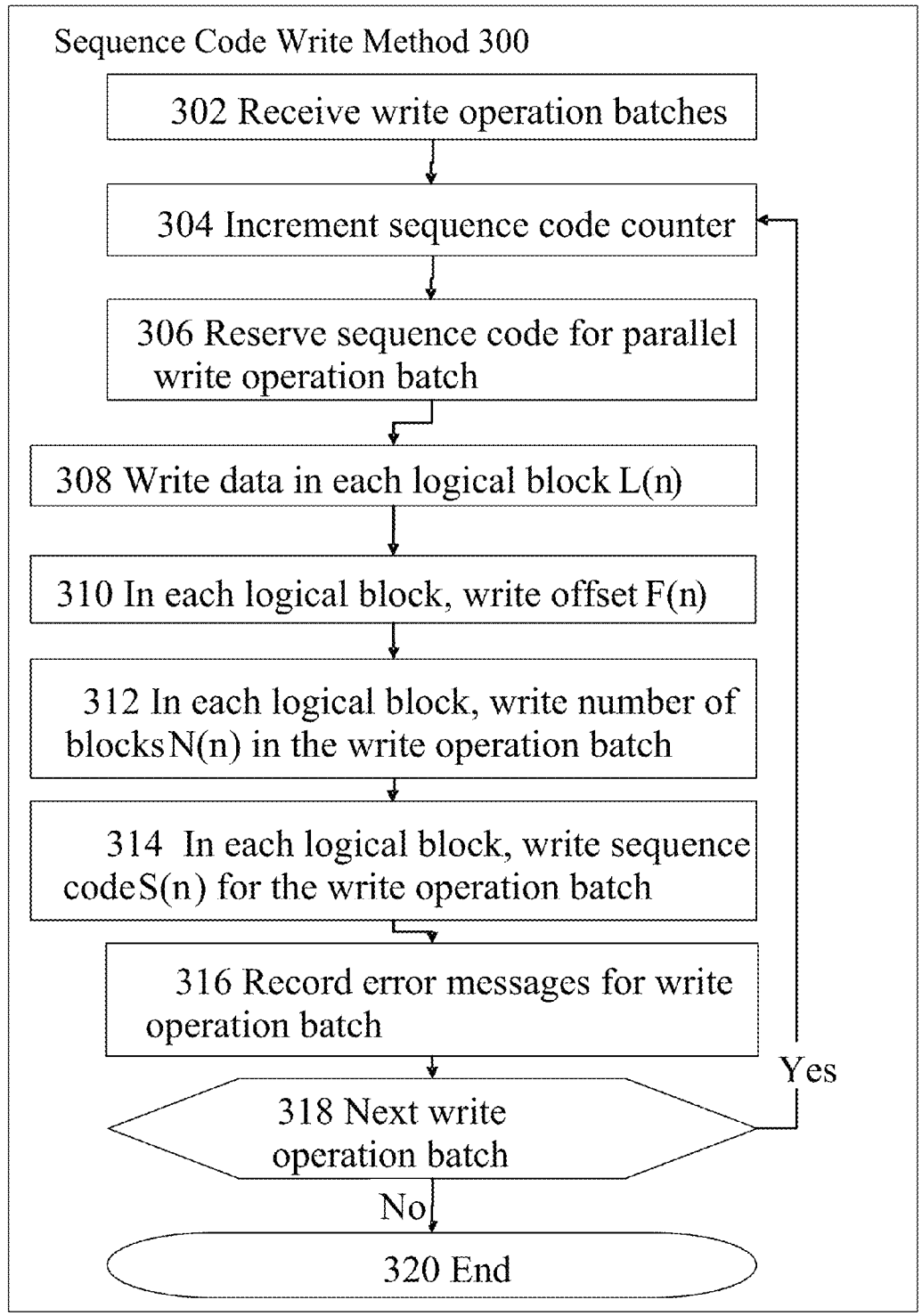
FIG. 3 is a flow diagram of a sequence code write method of an embodiment.

Referring to FIG. 3, sequence code write method 300 comprises logical process steps 302 to 320.

Step 302 is for receiving write operation batches from computers 14 and 16. A write operation batch is a sequence of data writes that form a single batch.

Step 304 is for incrementing the sequence code counter 206.

Step 306 is for reserving a sequence code using reservation mechanism 208 and sequence code counter 206.

Step 308 is for writing data of a write operation batch to logical blocks.

Step 310 is for writing block offset values F(n) to each logical block.

Step 312 is for determining a number of blocks N(n) used in the write operation batch and for writing the number N(n) in each logical block.

Step 314 is for writing the reserved sequence code S(n) in each logical block.

Step 316 is for recording any error message or messages for the write operation batch;

Step 318 is for branching back to step 304 if there are further write operation bathes. Else step 320.

Step 320 is the end of the method 300.

Referring to FIG. 4, sequence code verification method 400 comprises logical process steps 402 to 416.

Step 402 is for defining a loop for each logical block (n) from a plurality of logical blocks (zero to N).

Step 404 is for reading a pair of consecutive sequence numbers S(n) and S(n+1).

Step 406 is for invalidating the corresponding write operation batch if the sequence code S(n) is less than (<) the sequence code S(n+1) and the offset (n+1) is not equal to zero.

Step 408 is for invalidating the corresponding write operation batch if the sequence code S(n) is more than (>) the sequence code S(n+1) and offset F(n) is does not correspond to the number of logical blocks in the corresponding write operation batch for S(n). In this case, the offset F(n) should equal the number of logical blocks N(n) minus one.

Step 410 is for notifying an error for an invalidated write operation batch.

Step 412 is for determining if an error is a torn error by examining historical error messages corresponding to the write operation batch. If there is the corresponding write error then the discovered error is a torn error rather than a dropped error.

Step 414 is for branching back to step 404 if there is another logical block to be processed. Else step 416.

Step 416 is the end of method 400.

For example, existing data patterns used by an example disk testing tool ensure that when a write operation is performed, each sector of the data written contains:

The logical block address (LBA) or L(n)—this is the logical block address of the logical block (for instance within a sector of a disk). The first block is given the address L(0), the second block is L(1), the third block is L(2) and so on The offset of a logical block n from the start of the write is F(n).

The number of logical blocks in the write operation batch is N.

To perform write testing an additional parameter is added:

A sequence number S is incremented for each write operation batch. This sequence number is chosen to be an eight byte value. This means that, in any given test, there is no practical chance of this sequence number wrapping back to zero, as at a thousand write operations per second, it would take about five hundred million years to wrap. Each physical storage unit (for example a disk) that is being tested has its own sequence number.

Therefore, if thirty two write operations and then a write of eight blocks starting at L(102) is performed, then the data on the disk would look like:

| L | 102 | 103 | 104 | 105 | 106 | 107 | 108 | 109 | (Logical Block Address) |
|---|---|---|---|---|---|---|---|---|---|
| F | 0 | 1 | 2 | 3 | 4 | 5 | 6 | 7 | (Offset) |
| N | 10 | 10 | 10 | 10 | 10 | 10 | 10 | 10 | (Number of blocks in the write) |
| S | 33 | 33 | 33 | 33 | 33 | 33 | 33 | 33 | (Sequence Code) |

The following notation is used:

L(n) is the LBA written to the storage subsystem.

F(n) is the offset written to the storage subsystem at L(n).

N(n) is the number of blocks in the write operation that caused the data to be written at L(n).

S(n) is the sequence code associated with the write operation that placed the data at L(n).

If all writes correctly place the data onto the storage subsystem (that is there are no torn writes), then the following rules are true:

Rule 0. If S(n) is equal to S(n+1) then the data on these two blocks were written to the storage by the same write operation. L(n)+1 is expected to equal L(n+1) and F(n)+1 to equal F(n+1) in this case.

Rule 1. If S(n+1)>S(n) then L(n+1) must be first block of a write operation and hence F(n+1) must be 0

Rule 2. If S(n+1)<S(n) then L(n) must be the last block of a write operation, and hence F(n)+1 must equal N(n).

If the sequence numbers of two adjacent blocks are different and rule 1 or 2 is not true, then an erroneous write is detected and notified. For clarity if S(n+1) is not equal to S(n) then an erroneous write will have occurred at L(n) although in reality it could be argued that it is halfway between n and n+1.

Consider an example. A five block write is performed starting at L(104). If the write is successful then the data should look like:

| L | 102 | 103 | 104 | 105 | 106 | 107 | 108 | 109 |
|---|---|---|---|---|---|---|---|---|
| F | 1 | 2 | 0 | 1 | 2 | 3 | 4 | 7 |
| N | 10 | 10 | 5 | 5 | 5 | 5 | 5 | 10 |
| S | 33 | 33 | 34 | 34 | 34 | 34 | 34 | 33 |

The five block write is highlighted in bold and also underlined. If part of the write at L(104) is torn, then not all of the sectors involved in this second write are guaranteed to make it to the storage subsystem. There are five possible cases:

Case 1. Some of the blocks at the start of the write are missed (for example the blocks at 104 and 105 are dropped Case 2. Some of the blocks in the middle of the write are missed (for example the block at 106 is dropped)

Case 3. Some of the blocks at the end of the write are missed (for example the blocks at 107 and 108 are dropped)

Case 4. None of the blocks of the second write make it to the storage subsystem (for example the blocks intended for 104-108 are all dropped)

Case 5. All of the blocks of the second write make it to the storage subsystem

In case (1) the data on the storage subsystem will look like:

| L | 102 | 103 | 104 | 105 | 106 | 107 | 108 | 109 |
|---|-----|-----|-----|-----|---------|---------|---------|-----|
| F | 0   | 1   | 2   | 3   | 2   | 3   | 4   | 7   |
| N | 10  | 10  | 10  | 10  | 5   | 5   | 5   | 10  |
| S | 33  | 33  | 33  | 33  | 34  | 34  | 34  | 33  |

A three block write is highlighted in bold and also underlined. An erroneous write is detected since rule 1 fails—$S(n+1) > S(n)$ and $F(n+1)$ is not 0 when n=105. In other words L(106) is not the first block in a write. This rule detects a tear in the write at L(105).

In the case (2) the data on the disk would look like:

| L | 102 | 103 | 104 | 105 | 106 | 107 | 108 | 109 |
|---|-----|-----|---------|---------|-----|---------|---------|-----|
| F | 0   | 1   | 0   | 1   | 4   | 3   | 4   | 7   |
| N | 10  | 10  | 5   | 5   | 10  | 5   | 5   | 10  |
| S | 33  | 33  | 34  | 34  | 33  | 34  | 34  | 33  |

The relevant blocks are highlighted in bold and also underlined. An erroneous write is detected since rule 2 fails—$S(n+1) < S(n)$ and $F(n)+1$ is not equal to $N(n)$ when n=105. In other words L(105) is not the last block in the write that started at LBA n−F(n)=104. This rule detects a tear in the write at L(105).

In the case (3) the data on the storage subsystem will look like:

| L | 102 | 103 | 104 | 105 | 106 | 107 | 108 | 109 |
|---|-----|-----|---------|---------|---------|-----|-----|-----|
| F | 0   | 1   | 0   | 1   | 2   | 5   | 6   | 7   |
| N | 10  | 10  | 5   | 5   | 5   | 10  | 10  | 10  |
| S | 33  | 33  | 34  | 34  | 34  | 33  | 33  | 33  |

The relevant block write is highlighted in bold and also underlined. Again an erroneous write is detected since rule 2 fails—$S(n+1) < S(n)$ and $F(n)+1$ is not equal to $N(n)$ when n=106. This rule would detect a tear in the write at L(106).

In the case (4) the data on the storage subsystem will look like:

| L | 102 | 103 | 104 | 105 | 106 | 107 | 108 | 109 |
|---|-----|-----|-----|-----|-----|-----|-----|-----|
| F | 0   | 1   | 2   | 3   | 4   | 5   | 6   | 7   |
| N | 10  | 10  | 10  | 10  | 10  | 10  | 10  | 10  |
| S | 33  | 33  | 33  | 33  | 33  | 33  | 33  | 33  |

It might be thought that this erroneous write could be detected by the absence of any blocks with S(n)=34 being present on the storage subsystem. This rule would detect a tear in the write at L(104). In fact, performing a write-read-compare operation would detect any partial or complete tear anywhere in the write. However if further writes are performed that overlay L(104) to L(108), then it is no longer possible to know if the write with S=34 was ever performed on the storage subsystem. So the only way to detect a completely dropped write is to read the data back and check it for the presence of the expected data before it gets overwritten. In a sense though, a completely dropped write is not a true torn write, as there is no mix of old and new data on the storage subsystem.

In the case (5) all the correct data to the storage subsystem has been written and the only reason it might be a torn write is because the write did not complete properly. However there is no 'tear' in the data on the storage subsystem, so there is nothing to detect in terms of finding an erroneous write, and hence there is no need of a rule to cover this situation.

The rules for detecting an erroneous write are therefore:

Rule 1. If $S(n+1) > S(n)$ then a torn write is present if $F(n+1)$ is not 0

Rule 2. If $S(n+1) < S(n)$ then a torn write is present if $F(n)+1$ does not equal $N(n)$.

There is a limitation in this approach. The sequence number in the data is a key element of the method to detect erroneous write, as the error detection rules need to know the order in which writes were written to the storage subsystem. If there is never more than one write in progress at a time, then it is easy to insert a monotonically increasing sequence number in the data for each transfer. If more than one write operation is being run in parallel, using multiple threads, then this becomes more difficult. Consider the case where there are two threads, A and B in an application and they are both about to do a write operation. A is given the sequence code 100 and then the A thread is suspended, and the B thread runs. The B thread is given the next sequence code 101 and continues to run for a little longer so it is able to issue its write request to the host storage subsystem device driver. Then B is suspended and A runs and issues its write with sequence code 100. So the writes were not actually issued in the order corresponding to the sequence numbers and this is likely to result in an apparent torn write, if the data areas for the writes in A and B overlap.

The solution to this limitation is to use reservation mechanism 206 for the logical blocks associated with an application write. Note: this is not a SCSI type reservation but a purely an internal mechanism in the embodiments. Small Computer System Interface (SCSI) is a set of standards for physically connecting and transferring data between computers and peripheral devices.

Note; the scheme here will detect any tear in a write at any block in the original write. Other rules for different storage systems can be added.

For instance, a storage area network (SAN) volume controller (SVC) would not guarantee avoiding erroneous writes completely on cache enabled storage subsystem since they are allowed on thirty two block boundaries relative to the starting logical block. If the cache is in 'fast write mode' then erroneous writes will also be allowed on sixty four block boundaries relative to starting logical block. It is easy to add further rules to check that these additional constraints are met (or other constraint imposed by other types of disk storage subsystem). The instance example further rules for an SVC would be:

Rule 3—For the thirty two block boundary relative to the start of the original write condition, if an erroneous write occurs at L(n), then if F(n) modulus thirty two is zero then it is known that the erroneous write is at a thirty two block boundary relative to the start of the write, and in the SVC case this would be an erroneous write that is allowed to occur by the SVC specification.

Rule 4—For the sixty four block boundary relative to the start of the original write condition, if an erroneous write occurs at L(n), then the starting logical block for the original write can be deduced to be L(n)−F(n). If L(n)−F(n) modulus sixty four is zero then it is known that the original write started on a sixty four block boundary relative to the start of the original write condition, and in the SVC case this would be an erroneous write that is allowed to occur by the SVC specification.

All of the above discussion relates to the detection of the position (that the logical block address) of an erroneous write in a test environment, where a write operation has failed (that is has returned bad status) and it is wish to determine if the boundaries between the old/new data on the disk subsystem are consistent with the specification of the disk subsystem.

The same methodology could be used in a different scenario, that of detecting the case where a write returns good status and appears to work, but the storage subsystem has an internal fault which caused it to drop some of the data. Unfortunately, there has been a history of such faults in disk drive technology and disk controller software over the years, so such detection can be valuable, as it allows the host system to determine that the data it has read back from the disk is incorrect, even though it was told the write that placed the data on the disk subsystem had worked correctly. To make this work in a fixed block customer environment, the logical block address, offset, number of blocks and sequence number must still be stored on the disk, but the customer data will fully occupy the normal data area on each block. Typically this would be a five hundred and twelve byte block. It is therefore necessary to increase the block size of the disk to make space for these extra fields, and if eights bytes are allowed for the logical block address and sequence number and if 4 bytes are allowed for the offset and number of blocks, then each sector on the disk must contain 536 bytes of data. It might be necessary to make the sequence number 16 bytes to be certain to avoid any wrapping issues each time it is incremented.

With these extra four fields in place, the host system can apply rule 1 and rule 2 above, after each read operation and determine if there is an error in the data—if so, that indicates that a previous write has 'dropped' part of the data. Of course, if a write operation has failed in the past, then there could be a legitimate tear in the data—however it is easy for the host to keep track of these areas on the disk or repeat the write until it is successful. So this method can also be used to identify the loss of data due to a silently dropped write.

Further embodiments of the invention are now described. It will be clear to one of ordinary skill in the art that all or part of the logical process steps of an embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of an embodiment may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of an embodiment may alternatively be embodied fully or partially in a parallel computing system comprising two or more processors for executing parallel software.

It will be clear to one skilled in the art that many improvements and modifications can be made to the foregoing exemplary embodiment without departing from the scope of the present invention.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A verification system for validating data written to logical blocks on a storage subsystem, said storage subsystem being adapted so that during write operations of data to the logical blocks, an additional sequence code is written to each logical block whereby said sequence code remains constant for each write operation batch and whereby said sequence code is incremented for each new write operation batch, said verification system comprising:
   a data reader for reading respective first and second sequence codes (S(n) and S(n+1)) from consecutive first and second logical blocks (L(n) and L(n+1));
   a validity engine for checking validity by applying the following operations: invalidating a corresponding write operation batch if a first sequence code (S(n)) is less than the second sequence code (S(n+1)) and a block offset (F(n+1)) of the second logical block (L(n+1)) is not equal to zero; and invalidating the corresponding write operation batch if the first sequence code S(n) is more than the second sequence code S(n+1) and a block offset (F(n)) of a first logical block (L(n)) does not correspond to a number of logical blocks in a corresponding batch write operation for the first logical block (L(n)); and
   an error notifier for notifying an error for each invalidated write operation batch.

2. A verification system according to claim 1 further comprising ensuring that a first thread (A) places a reservation in the storage subsystem for those logical blocks that it is going to write to, before it obtains a sequence number it will use in the write.

3. A verification system according to claim 1 wherein a sequence code is an eight byte value.

4. A verification system according to claim 1 wherein checking validity by applying a further test of validating the first and second logical blocks (L(n) and L(n+1)) if a torn write occurs at logical block L(n) where the block offset F(n) modulus of a predetermined verification system block offset is zero.

5. A verification system according to claim 1 wherein a block offset (F(n)) of the first logical block (L(n)) equals the number of logical blocks in the batch write operation minus one.

6. A verification system according to claim 1 wherein sequence codes are written to that part of the logical block that is reserved for application data.

7. A verification system according to claim 1 wherein sequence codes are written to that part of the logical block that is reserved for metadata.

8. A method for validating data written to logical blocks on a storage subsystem, said storage subsystem being adapted so that during write operations of data to logical blocks, an additional sequence code is written to each logical block whereby said sequence code remains constant for each write operation batch and whereby said sequence code is incremented for each new write operation batch, said method comprising:
- (A) reading respective first and second sequence codes (S(n) and S(n+1)) from consecutive first and second logical blocks (L(n) and L(n+1));
- (B) checking validity by applying the following operations:
  - (1) invalidating a corresponding write operation batch if a first sequence code (S(n)) is less than the second sequence code (S(n+1)) and a block offset (F(n+1)) of the second logical block (L(n+1)) is not equal to zero;
  - (2) invalidating the corresponding write operation batch if the first sequence number (S(n)) is more than the second sequence number (S(n+1)) and a block offset F(n) of a first block (L(n)) does not correspond to the number of logical blocks in a corresponding batch write operation for a first logical block (L(n));
- (C) notifying an error for each invalidated write operation batch; and performing steps (A), (B) and (C) for each logical block (n) from a plurality of logical blocks (zero to N).

9. A method according to claim 8 further comprising ensuring that a first thread (A) places a reservation in the storage subsystem for those logical blocks that it is going to write to, before it obtains the sequence number it will use in the write.

10. A method according to claim 8 wherein the sequence code is an eight byte value.

11. A method according to claim 8 wherein checking validity by applying a further test of validating the logical block pair (n and n+1) if a torn write occurs at logical block L(n) where block offset F(n) modulus of a predetermined verification system block offset is zero.

12. A method according to claim 8 wherein the block offset F(n) of the first logical block (L(n)) equals the number of logical blocks in the batch write operation minus one.

13. A method according to claim 8 wherein sequence codes are written to that part of the logical block that is reserved for application data.

14. A method according to claim 8 wherein sequence codes are written to that part of the logical block that is reserved for metadata.

15. A computer program product for validating data written to logical blocks on a storage subsystem, said storage subsystem being adapted so that during write operations of data to logical blocks, an additional sequence code is written to each logical block whereby said sequence code remains constant for each write operation batch and whereby said sequence code is incremented for each new write operation batch, the computer program product comprising:
- a computer readable storage medium having stored thereon:
- program instructions executable by a device [e.g., computer, processor, processing circuit, etc.] to cause the device to:
  - (A) reading respective first and second sequence codes (S(n) and S(n+1)) from consecutive first and second logical blocks (L(n) and L(n+1));
  - (B) checking validity by applying the following operations:
    - (1) invalidating a corresponding write operation batch if a first sequence code (S(n)) is less than the second sequence code (S(n+1)) and a block offset (F(n+1)) of the second logical block (L(n+1)) is not equal to zero;
    - (2) invalidating the corresponding write operation batch if the first sequence number (S(n)) is more than the second sequence number (S(n+1)) and a block offset F(n) of a first block (L(n)) does not correspond to the number of logical blocks in a corresponding batch write operation for a first logical block (L(n));
  - (C) notifying an error for each invalidated write operation batch; and performing steps (A), (B) and (C) for each logical block (n) from a plurality of logical blocks (zero to N).

16. The computer program product of claim 15 wherein the program instructions further cause the device to ensure that a first thread (A) places a reservation in the storage subsystem for those logical blocks that it is going to write to, before it obtains the sequence number it will use in the write.

17. The computer program product of claim 15 wherein the program instructions further cause the sequence code to be an eight byte value.

18. The computer program product of claim 15 wherein the program instructions further cause the device to check validity by applying a further test of validating the logical block pair (n and n+1) if a torn write occurs at logical block L(n) where block offset F(n) modulus of a predetermined verification system block offset is zero.

19. The computer program product of claim 15 wherein the program instructions further cause the block offset F(n) of the first logical block (L(n)) to equal the number of logical blocks in the batch write operation minus one.

20. The computer program product of claim 15 wherein the program instructions further cause sequence codes to be written to a part of the logical block that is reserved for application data.

\* \* \* \* \*